W. H. VOSS.
GEARING.
APPLICATION FILED SEPT. 29, 1916.
1,292,169.
Patented Jan. 21, 1919.
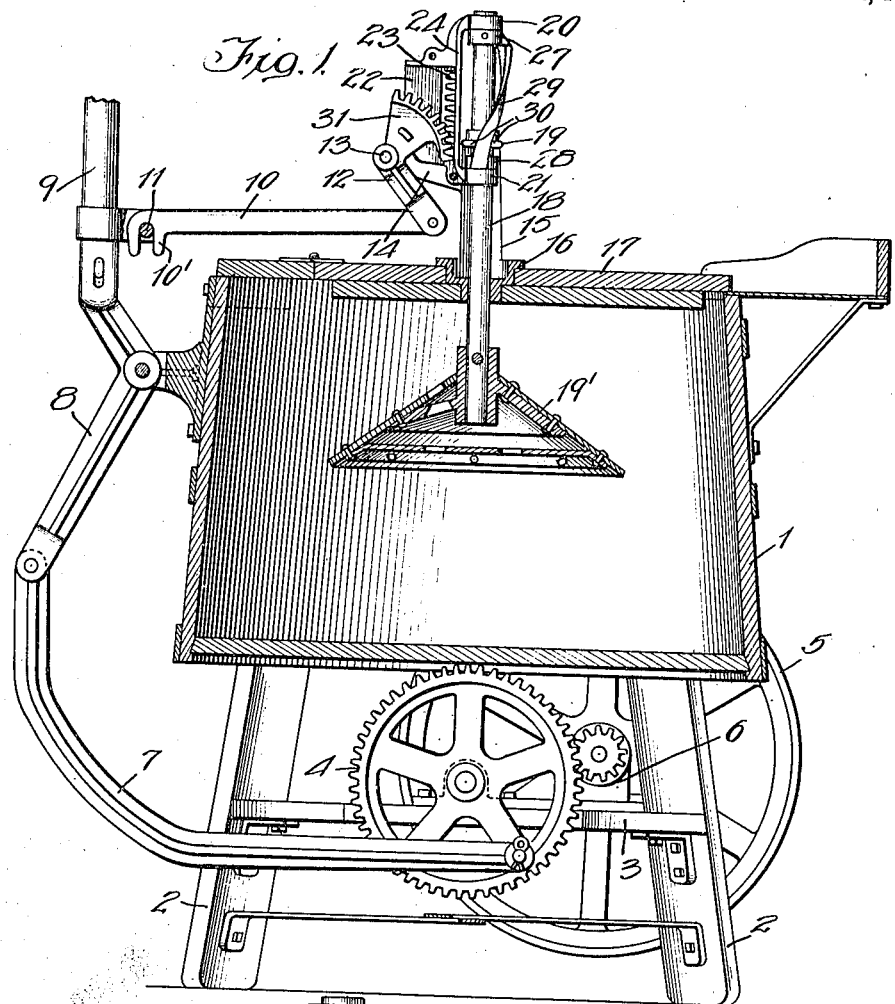
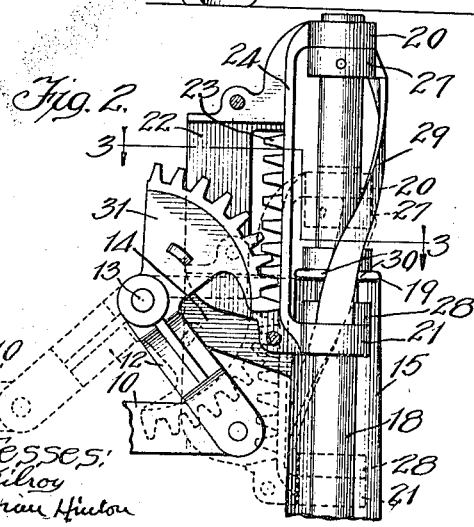
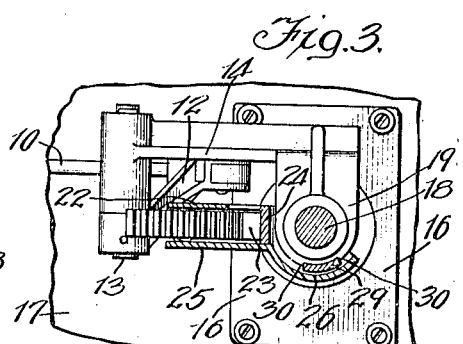

UNITED STATES PATENT OFFICE.

WILLIAM H. VOSS, OF DAVENPORT, IOWA.

GEARING.

1,292,169.   Specification of Letters Patent.   Patented Jan. 21, 1919.

Application filed September 29, 1916. Serial No. 122,802.

*To all whom it may concern:*

Be it known that I, WILLIAM H. VOSS, a citizen of the United States, residing at Davenport, in the county of Scott and State of Iowa, have invented certain new and useful Improvements in Gearings.

This invention relates to gearing and particularly to gearing adapted to be employed in connection with washing machines.

It is an object of the invention to provide a gearing of the class described, compact, simple and economical in construction and efficient and easy in operation.

It is another object of the invention to economize in weight and metal and at the same time provide mechanism of the character described in which the moving parts, meshing gears, and the like, are safely housed and protected.

Other objects and advantages of the invention will appear as the description to follow proceeds.

In the drawings:—

Figure 1 is a sectional view of a washing machine constructed according to my invention;

Fig. 2 is a detail enlarged elevation of a portion of the gearing thereof;

Fig. 3 is a cross sectional view on the line 3—3 of Fig. 2.

1 represents a tub, provided with legs 2 of ordinary construction. A platform 3 is provided and supported upon the legs and carries the bearings upon which rotates gear wheel 4 in mesh with a heavy fly wheel 5 supported on the bracket 6, supported in turn upon the platform 3. The gear wheel 4 is driven by the bent link 7 pivotally connected at its end to the bell crank 8, which is provided with operating handle 9. The link 10 is connected by a fork 10' with the pin 11 on the bell crank 8 and is connected at its other end with the arm 12 pivoted at 13 upon an extension 14 upon an upright bracket 15, provided with an extended foot portion 16 and bolted to the top 17 of the tub. The foot portion 16 of the bracket is provided with an aperture, and a vertical dolly operating shaft 18 passes through the aperture, being provided with a dolly 19' on its lower end. The shaft 18 passes through the bearing 19 carried adjacent the upper end of the bracket 15. Revolubly mounted upon the shaft 18 and spanning the bearing 19, is a casing construction comprising the collars 20 and 21 and having an extended flange 22 offset from the rack 23 integral with the vertical connecting portion 24 connecting the upper and lower collars 20 and 21.

A housing construction is provided, adapted to be bolted onto the structure just described and comprises a flange 25 which covers the side of and extends beyond the rack 23, and a cylindrical portion 26, to partly encircle the shaft 18. Firmly secured to the shaft 18 are the collars 27 and 28, connecting which is the integrally formed spiral guide 29. The collars 27 and 28 span the bearing 19. Adjacent that bearing the bracket 15 is extended to form a pair of ears or lugs 30 so that the spiral guide 29 is maintained at all times between said lugs. Integral with the arm 12 is a sector gear 31, which meshes with the rack 23 so that as the link 10 is reciprocated the rack 23 is moved up and down, which owing to the engagement between the spiral guide 29 and the lugs 30, causes a continual oscillation of the shaft 18 in addition to the vertical movement communicated to that shaft by reason of the vertical movement of the rack which is rigidly secured thereto.

Having thus described my invention, I claim:—

1. A gearing, comprising a support, a hinged member mounted on the support, a vertical shaft reciprocable and oscillatable in said hinged member, a bracket having a bearing for said shaft, a straight rack mounted on said shaft, an oscillatable sector gear adapted to reciprocate said rack and shaft, and means for causing said shaft to oscillate as it is vertically reciprocated.

2. In apparatus of the class described, a support, a hinged member mounted thereon, a shaft adapted to reciprocate and oscillate in said hinged member, a straight rack mounted on said shaft, a sector gear adapted to operate said shaft, means including power mechanism means for oscillating said sector gear to cause the reciprocation of said rack, and means to cause said shaft to oscillate as said rack reciprocates.

3. In apparatus of the class described, support, a hinged member mounted thereon, a shaft adapted to reciprocate vertically and oscillate horizontally in said hinged member, a bearing for said shaft rigidly connected with said hinged member, a pair of collars rigidly mounted on said shaft, one on either side of said bearing, a guide rigidly connected with said collars, an operating guide adjacent said bearing, and gear means to cause the vertical reciprocation of said shaft.

4. In apparatus of the class described, a support, a top member mounted thereon, a vertical shaft mounted in said top member and reciprocable and oscillatable therein, a straight rack mounted on said shaft, an oscillatable sector gear adapted to reciprocate said rack and shaft, and means for causing said shaft to oscillate as it is vertically reciprocated.

5. In apparatus of the class described, a hinged member, a shaft adapted to be reciprocated therein, a bearing for said shaft rigidly connected with said hinged member, a pair of collars fastened on said shaft, one on each side of said bearing, a guide connecting said collars, and a casing loosely connected to said shaft by collars mounted upon said shaft, one on either side of the fixed collars.

6. In apparatus of the class described, a hinged member, a bracket thereon, a bearing in said bracket, a shaft movable in said bearing, a guide spanning said bearing and rigidly connected to said shaft, a casing movably connected with said shaft and spanning said guide, and means for causing the vertical reciprocation of said casing.

7. In apparatus of the class described, a support, a hinged member mounted thereon, a bracket mounted on said hinged member and having a bearing, a shaft movable in said bearing, a guide having a spirally arranged portion spanning said bearing, a casing loosely mounted on said shaft and spanning said guide, a rack in said casing, and a sector gear pivoted in said bracket and adapted to cause the vertical reciprocation of said casing and thereby of said shaft.

8. In apparatus of the class described, a support, a hinged member thereon, a bracket on said hinged member, a shaft vertically reciprocable in said hinged member, a pair of lips on said bracket, a helical guide rigidly connected with said shaft and confined by said lips, and means independent of said guide to cause the vertical reciprocation of said shaft.

9. In apparatus of the class described, a support, a hinged member mounted thereon and having a bearing therein, a shaft adapted to reciprocate and oscillate in said bearing, a straight rack mounted on said shaft, and adapted to reciprocate in a single plane, means for reciprocating said rack in a single plane, said rack also reciprocating said shaft, and means to cause said shaft to oscillate as it and said rack reciprocates.

In witness whereof, I hereunto subscribe my name to this specification in the presence of two witnesses.

WILLIAM H. VOSS.

Witnesses:
WILLIAM E. PULS,
GEORGE W. CARDINAL.